United States Patent [19]

Bilodeau

[11] Patent Number: 5,117,328
[45] Date of Patent: May 26, 1992

[54] PAYLOAD RETENTION APPARATUS

[75] Inventor: Jules A. Bilodeau, Goleta, Calif.

[73] Assignee: Raytheon Company, Lexington, Mass.

[21] Appl. No.: 506,303

[22] Filed: Apr. 9, 1990

[51] Int. Cl.⁵ .................. H05K 7/20; F16B 11/00
[52] U.S. Cl. .................. 361/380; 403/274; 403/280; 403/285
[58] Field of Search ............ 361/380, 397, 399; 403/274, 280, 285; 102/293, 357, 464, 473, 489, 505

[56] References Cited

U.S. PATENT DOCUMENTS

| 4,290,365 | 9/1981 | Dreyer | 102/464 |
| 4,646,644 | 3/1987 | Richmond et al. | 102/357 |
| 4,938,145 | 7/1990 | Martwick | 102/434 |

Primary Examiner—Leo P. Picard
Assistant Examiner—Bot L. Ledynh
Attorney, Agent, or Firm—Richard M. Sharkansky

[57] ABSTRACT

A method of securing an object into a shell is disclosed. According to the method, countersink holes are drilled into the object. The object is inserted in the shell and the shell is deformed into the countersink holes to form dimples.

5 Claims, 2 Drawing Sheets

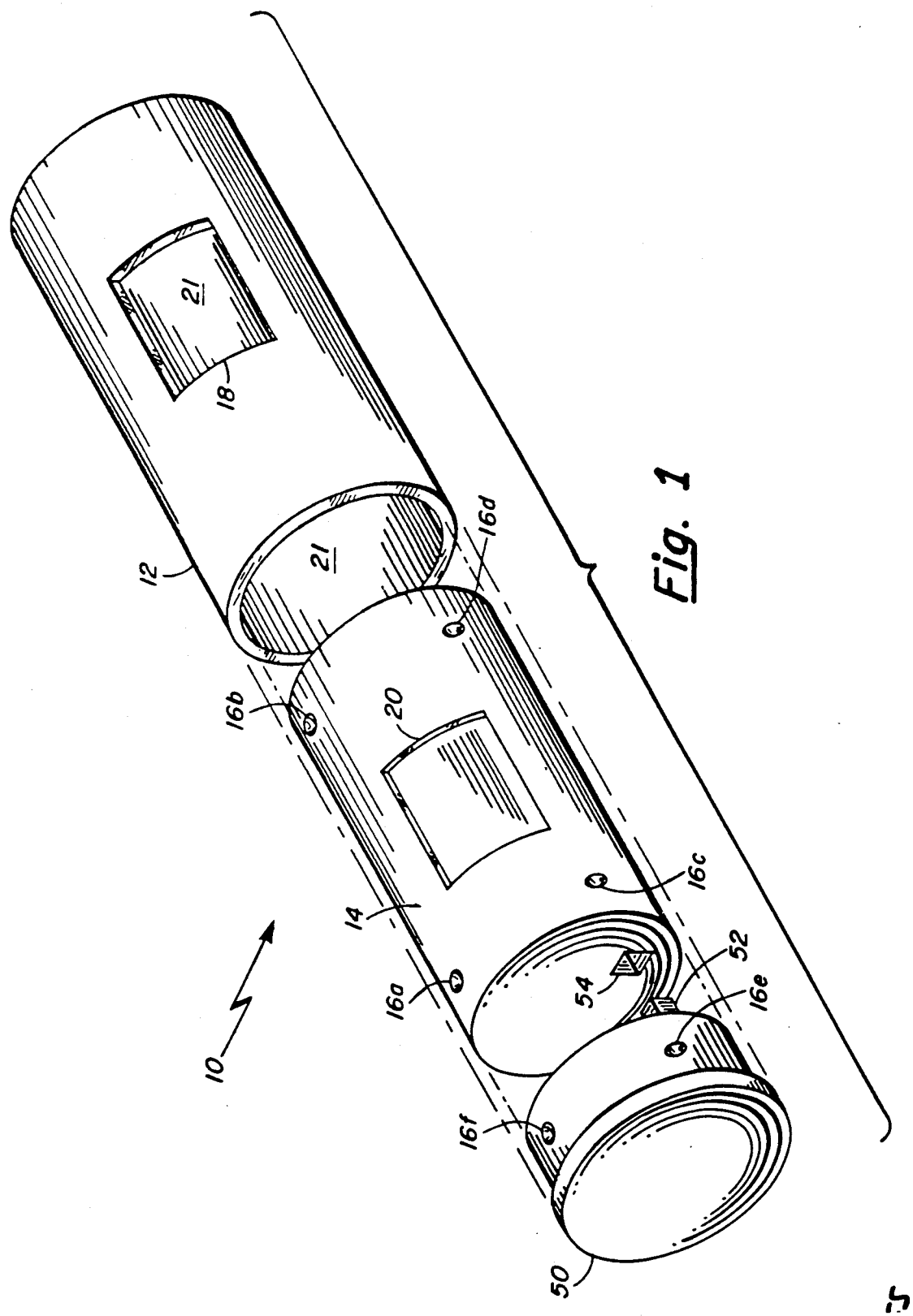

1

PAYLOAD RETENTION APPARATUS

This invention was made with Government support under Contract No. 00019-87-C-0135 awarded by the Department of the Navy. The Government has certain rights in this invention.

BACKGROUND OF THE INVENTION

This application relates generally to methods of attaching objects together and more particularly to methods of securing an assembly containing electronics inside a hollow shell.

In many instances, it is necessary to secure an assembly containing electronic components inside a protective shell. This need arises because the electronic components must be exposed while they are being assembled but must be covered by a protective shell when in use.

Various methods of securing an assembly inside a shell are known. One method is to cut a tab at the open end of the shell. Once the assembly is inside the hollow shell, the tab is folded down to partially block the opening of the shell. This method, however, is only useful if the shell is to remain open at the end. In many instances, it is unacceptable to allow the electronics to be exposed to the environment at the ends of the shell. Further, when exposed to high G forces, the assembly tends to slip out from the shell.

Another technique of securing an assembly inside a shell is called "magnaforming". In this technique, a thin metal shell is propelled explosively at the assembly. The metal wraps securely around the assembly, forming a protective cover. One disadvantage of this technique is that the metal is propelled as a result of the release of energy in a large capacitive discharge. The capacitive discharge, however, may damage electronic components and magnaforming is not appropriate for securing an electronic assembly in a cover.

Screws are also used for securing assemblies inside protective covers. However, where the screws are used to secure an assembly into a this walled cover, very small flat head screws must be used if the screws are to be flush with the surface of the cover. Very small screws, however, are fragile and prone to damage at assembly. Alternatively, if larger screws are used, the screws will protrude beyond the cover. Such an arrangement is not desirable if the assembly must move since the protruding screws tend to get caught on other objects.

Another technique for securing an assembly inside a cylindrical shell is called "ring swaging". According to this technique, a groove is machined into the assembly before it is placed inside the shell. The shell is then deformed to protrude into the groove, thereby securing the assembly. This technique, however, leaves a groove along the outside of the cover. As with screws, this groove can get caught if the assembly with its grooved outer shell moves relative to other components.

Some form of adhesive could be used to secure the assembly to the shell. However, assembling parts with adhesive is sometimes difficult. The manufacturing complexity of using adhesive makes this technique undesirable.

More complicated schemes for securing an assembly inside a cover are also known. For example, split rings or locking rings are sometimes used. However, these techniques, because they require added components, add complexity, cost, packaging volume, and weight to the finished product. These attributes are often undesirable.

The need for securing an electronics assembly in a shell acting as a protective cover is particularly acute in a military environment. One such example is an electronic decoy. Decoys contain an electronic assembly which produces RF signals similar to what are produced by a plane, ship, tank, or some other piece of military hardware. Enemy RF receivers are, thus, deceived into reporting the presence of military hardware which is not in fact present. Enemy fire is drawn towards the decoy rather than at real military hardware.

Decoys are often propelled into a desired position. Thus, whatever means are used to secure the payload inside the shell must be able to withstand high G forces. Moreover, where the decoy is propelled from a launcher, the decoy can contain no protruding screws or grooves which could get caught in the launcher. Further, since decoys are expendable, the decoy must be made as inexpensively as possible.

Based on the requirements for a decoy, all the known methods of securing an electronics assembly to a cover suffer at least one shortcoming.

SUMMARY OF THE INVENTION

With the foregoing background in mind, it is an object of this invention to provide a low-cost method of securing an electronics assembly into a shell.

It is also an object to provide a method of securing an electronics assembly into a shell which will withstand high G forces.

It is a further object of this invention to provide a method of securing an electronics assembly inside a protective shell to form a decoy.

The foregoing and other objects are achieved by a method which comprises drilling countersink holes into the payload. The payload is then slid into a thin walled cylindrical shell. The shell is then deformed into the countersink hole to form a dimple in the cover.

BRIEF DESCRIPTION OF THE DRAWINGS

The present invention will be better understood by reference to the following more detailed description and accompanying drawings in which FIG. 1 is a simplified exploded view of a decoy;

DESCRIPTION OF THE PREFERRED EMBODIMENTS

FIG. 1 shows a simplified exploded view of a payload 14 enclosed in a shell 12 of protective material. To form a decoy, payload 14 is fabricated using known techniques to construct circuitry commonly found in a decoy.

Shell 12 is some suitable, maleable protective material. Here, aluminum with a thickness of approximately 35 mils is used. Known techniques are used to form shell 12 such that payload 14 fits with close tolerance to inner surface 21, here 6 to 12 mils diametrical clearance, inside shell 12.

Figure 2A:
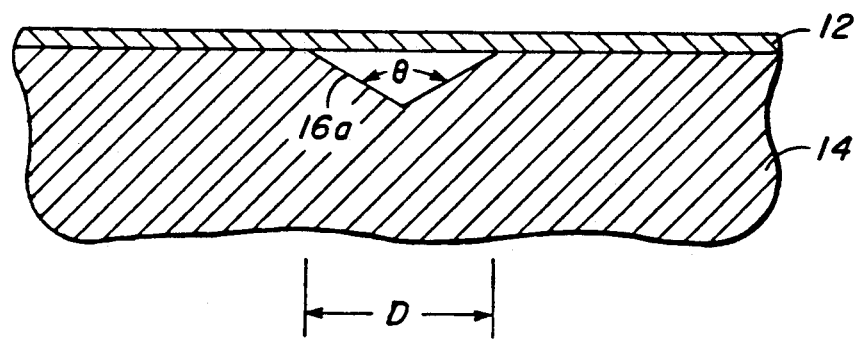
FIG. 2A is a cross-sectional view of an assembly and cover before a dimple is formed.

Payload 14 has drilled in it a plurality of countersink holes, 16a . . . 16d. FIG. 2A shows, for illustration, countersink hole 16a in cross-section. Countersink hole 16a has a maximum diameter, D, of 0.25 inches. As seen in FIG. 2A, the walls of countersink hole 16a have a conical taper at an included angle θ of 118°.

Figure 2B:
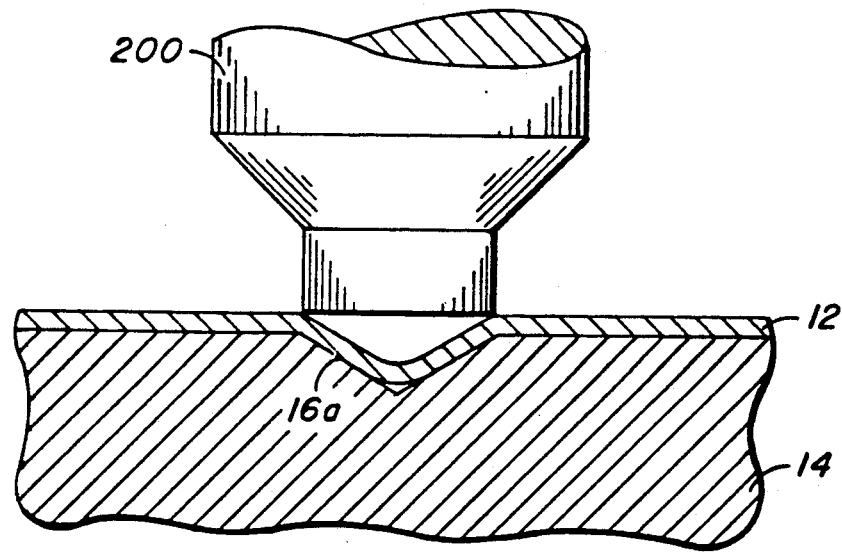
FIG. 2B is a cross-sectional view of an assembly and cover while a dimple is formed.

FIG. 2A shows payload 14 inside shell 12. As illustrated in FIG. 2A, payload 14 is free to slide relative to shell 12. FIG. 2B shows countersink hole 16a during a swaging operation. After the swaging operation, payload 14 will no longer be free to slide relative to shell 12 and will, thus, be secured to shell 12.

As seen in FIG. 2B, a swaging tool 200 is pressed into countersink hole 16a, thereby deforming shell 12 into countersink hole 16a. The tip of swaging tool 200 conforms substantially to the contour of countersink hole 16a. Swaging tool 200 does not, however, come to a sharp point like countersink hole 16a to avoid piercing shell 12.

After swaging, shell 12 has a round, depressed region called a "dimple". In the dimple, shell 12 is pressed firmly against all sides of countersink hole 16a. Thus, payload 14 is prevented from moving in all directions relative to shell 12.

A single dimple can restrain payload 14 from moving any significant amount relative to shell 12 when forces up to several hundred pounds are applied to payload 14. If greater forces are to be applied, more dimples are formed. FIG. 1 shows four countersink holes 16a ... 16d in payload 14. Shell 12 is also swaged into these countersink holes to form four dimples securing payload 14 to shell 12. Since the dimples ideally are disposed symmetrically about shell 12, dimples are formed on each quadrant of shell 12 not visible in FIG. 1.

To form a dimple, it is necessary that swaging tool 200 be aligned with one of the countersink holes 16a ... 16d. The alignment is achieved using index opening 18 in shell 12. Input/output section 20 on payload 14 is aligned with index opening 18 and serves as the corresponding payload index. Here, input/output section 20 contains output elements actuated by payload 14. Input/output section 20 could as well contain controls to adjust the operation payload 14.

In constructing payload 14, the locations of countersink 16a ... 16d relative to input/output section 20 are known. When payload 14 is slid into shell 12 and input/output section 20 is aligned with opening 18, the positions of countersink holes 16a ... 16d are known with respect to opening 18. The correct locations for forming dimples are thus known.

FIG. 1 shows a cap 50 which fits on the end of shell 12 after payload 14 is inside shell 12. Cap 50 is also secured with dimples. FIG. 1 shows two countersink holes 16e and 16f. Shell 12 is dimpled into countersink holes 16e and 16f as described above. The placement of the dimples is measured relative to index opening 18.

Here, cap 50 has a key 52 which fits into opening 54 on payload 14. The placement of countersink holes 16e and 16f relative to key 52 is known. The dimples are formed in shell 12 with that same relationship with key 52 in opening 54. Key 52 has a known relationship to index opening 18. The relationship of countersink holes 16e and 16f to index opening 18 can thus be determined.

It will be appreciated that the method of securing payload 14 into shell 12 does not significantly increase packaging volume or require added components, weight, or significant cost to the manufacture of the decoy. Moreover, the dimples are relatively small and do not impede ejection of the decoy from a launcher. The present invention, thus, solves significant problems associated with the prior art.

What is claimed is:

1. A decoy comprising:
    a) an electronics assembly having a plurality of countersink holes formed therein and a first alignment indicia; and
    b) a shell adapted to receive the electronics assembly and having a second alignment indicia, with portions of the shell being deformed into the countersink holes to substantially confirm to the contours of the countersink holes with the first and second alignment indicia having a predetermined spatial relationship.

2. The decoy of claim 1:
    a) wherein the first alignment indicia comprises an opening; and
    b) wherein the second alignment indicia comprises an input/output section aligned with said opening.

3. The decoy of claim 1 additionally comprising a cap having a third alignment indicia, a portion of said cap extending into the shell, said portion having a plurality of countersink holes formed therein, with portions of the shell being deformed into the countersink holes and with said first and third alignment indicia having a predetermined spatial relationship.

4. The decoy of claim 3 wherein the third alignment indicia comprises a key projecting into an opening in the electronic assembly.

5. The decoy recited in claim 1 wherein said countersink holes have a conical taper.

* * * * *